Dec. 20, 1955
HENRI-GEORGES DOLL
METHODS AND APPARATUS FOR LOGGING
SPONTANEOUS POTENTIALS IN WELLS
2,728,047
Filed June 13, 1952
5 Sheets-Sheet 2
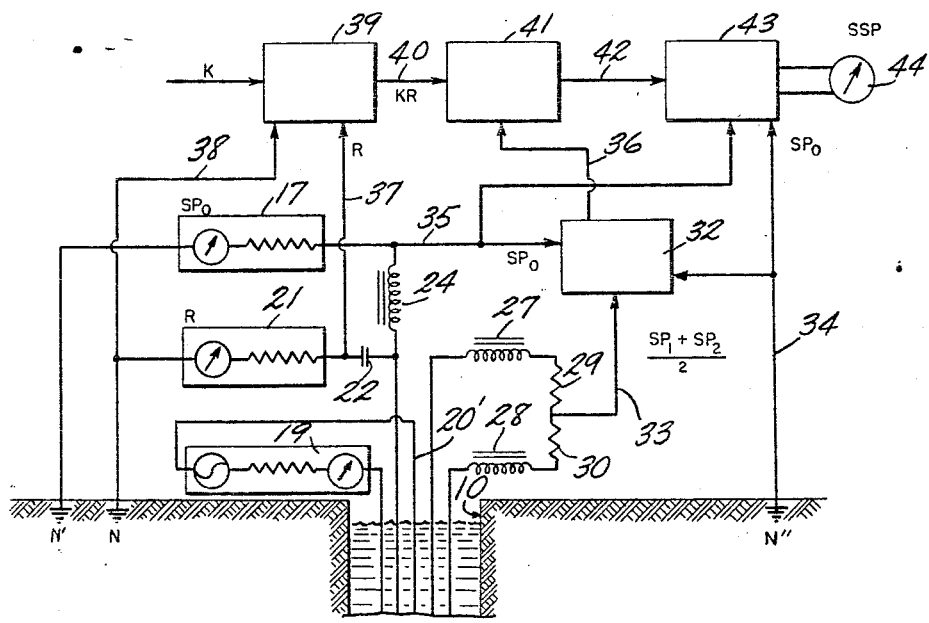
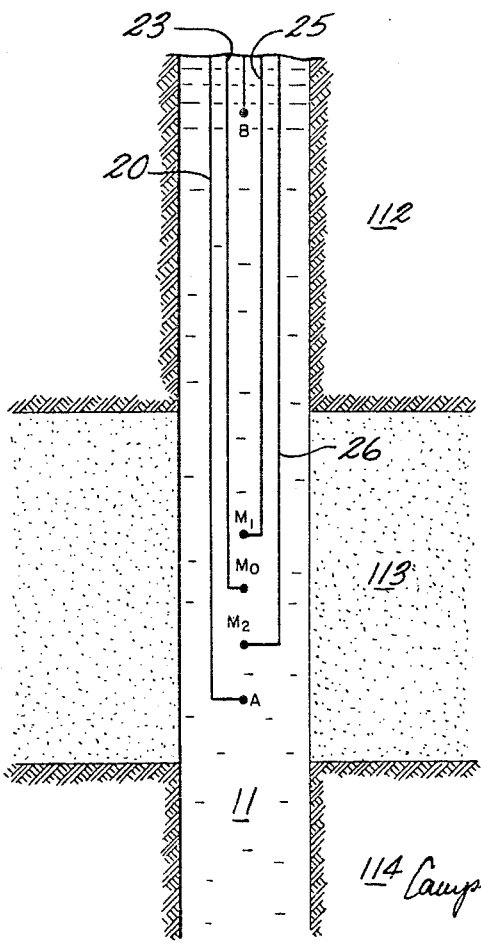
FIG. 3.
INVENTOR.
HENRI-GEORGES DOLL
BY
Campbell, Brumbaugh, Free & Graves
his ATTORNEYS

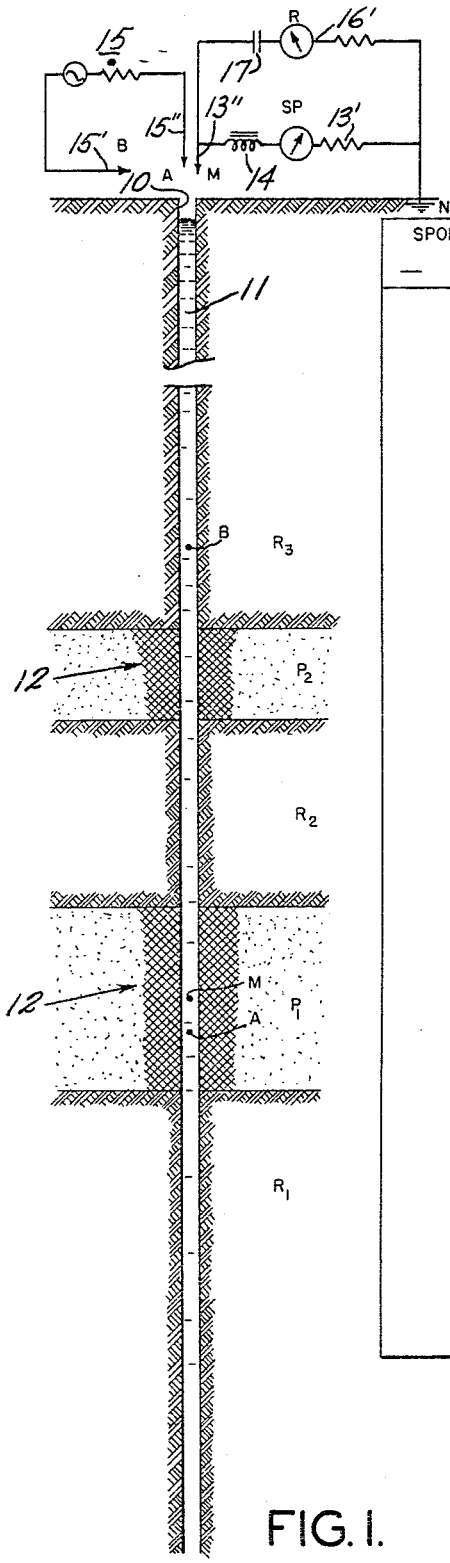

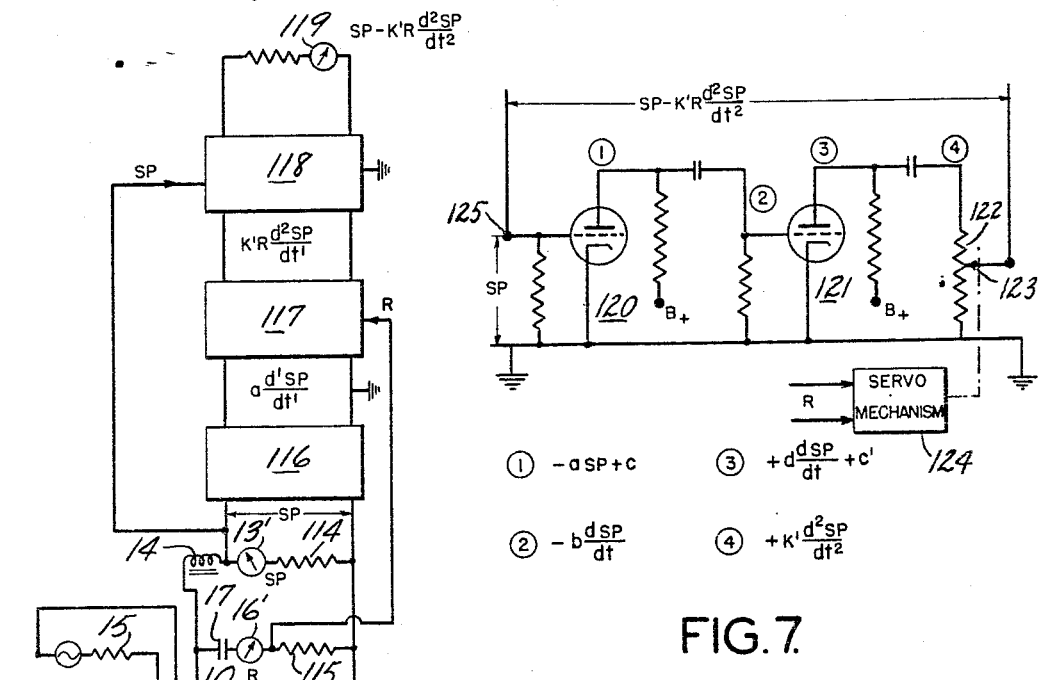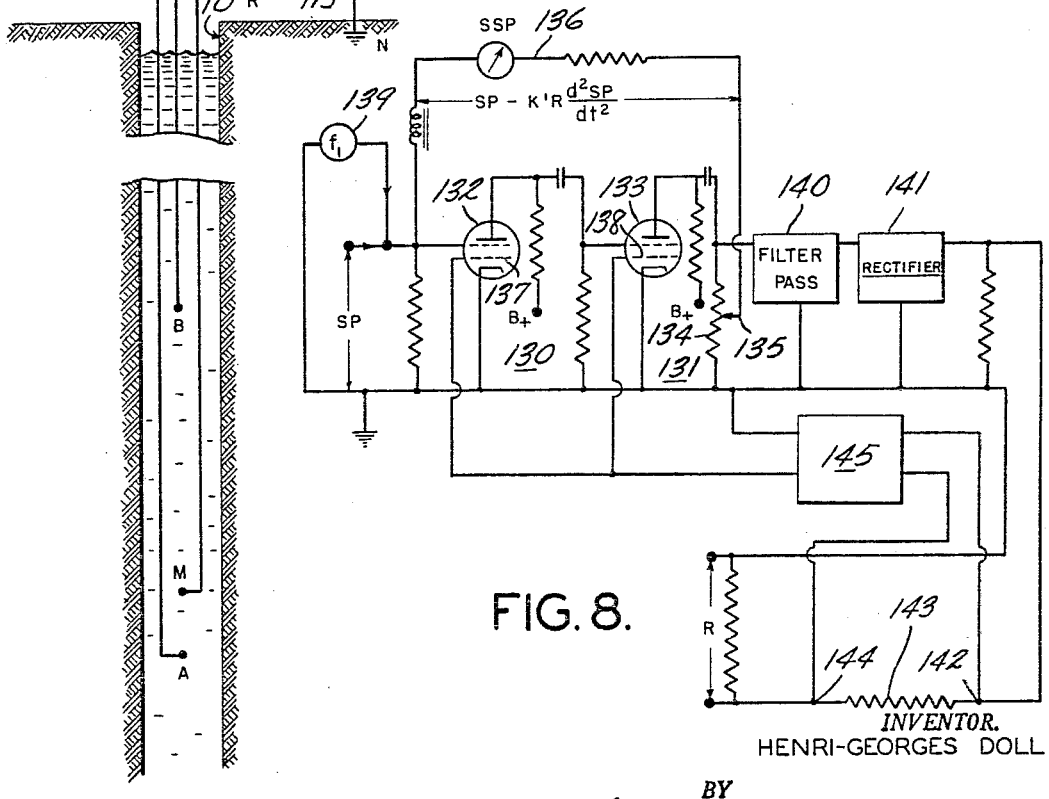

United States Patent Office 2,728,047
Patented Dec. 20, 1955

2,728,047

METHODS AND APPARATUS FOR LOGGING SPONTANEOUS POTENTIALS IN WELLS

Henri-Georges Doll, Ridgefield, Conn., assignor to Schlumberger Well Surveying Corporation, Houston, Tex., a corporation of Delaware Application June 13, 1952, Serial No. 293,242

19 Claims. (Cl. 324—1)

The present invention relates to methods and apparatus for spontaneous potential well logging and more particularly to novel methods and apparatus for obtaining detailed spontaneous potential logs of formations traversed by a bore hole containing electrically conducting drilling liquid.

Conventional spontaneous potential logs of the type disclosed in U. S. Patent No. 1,913,293 to Conrad Schlumberger are widely used with great success for determining the location and vertical extent of permeable formations traversed by a bore hole. Their interpretation is sometimes difficult, however, as in the case of thin beds or in the case of highly resistive formations.

In my U. S. Patent No. 2,592,125, entitled "Methods and Apparatus for Logging Static Spontaneous Potentials in Wells," there are disclosed highly effective means for obtaining spontaneous potential indications which are more nearly representative of the static spontaneous potentials of formations traversed by a bore hole and are thus more accurately definitive of the boundaries between permeable and impermeable beds regardless of the types of formations present. However, due to the fact that the systems described in my said patent require the use of a control current passing through the fluid in the bore hole and also require the use of many cable-conductors connecting the down-hole equipment with the surface, practical difficulties are experienced in combining said systems with other types of apparatus for obtaining simultaneously with the static SP a plurality of resistivity measurements.

Accordingly, it is a primary object of the present invention to provide novel methods and apparatus for obtaining spontaneous potential logs which overcome the several disadvantages of the prior art as noted above.

Another object of the present invention is to provide novel methods and apparatus for obtaining indications which substantially represent the static spontaneous potentials of formations traversed by a bore hole.

A further object of the present invention is to provide novel methods and apparatus of the above character which may be readily employed with systems for obtaining one or more resistivity indications of the formations traversed by a bore hole.

These and other objects are attained in accordance with the invention by measuring, as by the use of an electrode array inserted in a bore hole, quantities which are respectively functions of the spontaneous potentials and of the resistivities of the formation material at corresponding levels. The several quantities, which will preferably be in the form of electrical signals, are utilized in novel apparatus to provide values which are representative of the spontaneous potentials to a degree affording an improved bore hole log which is both detailed and accurate. In fact, the resulting log is a close approximation to the theoretical static spontaneous potential diagram of the bore hole.

The invention may be more fully understood by reference to the accompanying drawings in which:

Figure 1 shows schematically means for obtaining a conventional spontaneous potential or SP log and a single resistivity log of formations traversed by a bore hole;

Figure 2 shows a typical SP and resistivity log, as well as a static SP diagram for the formations shown in Figure 1;

Figure 3 shows one embodiment of the invention for measuring a quantity approximating the static SP;

Figure 4A is a view of the bore hole equipment shown schematically in Figure 4;

Figure 6 shows another embodiment of the invention which may be employed to obtain an improved SP log in accordance with the invention;

Figure 7 shows in detail electronic equipment which may be employed with the apparatus disclosed in Figure 6; and Figure 8 shows a second electronic circuit that may be employed in connection with the embodiment of the invention shown in Figure 6.

Figure 4:
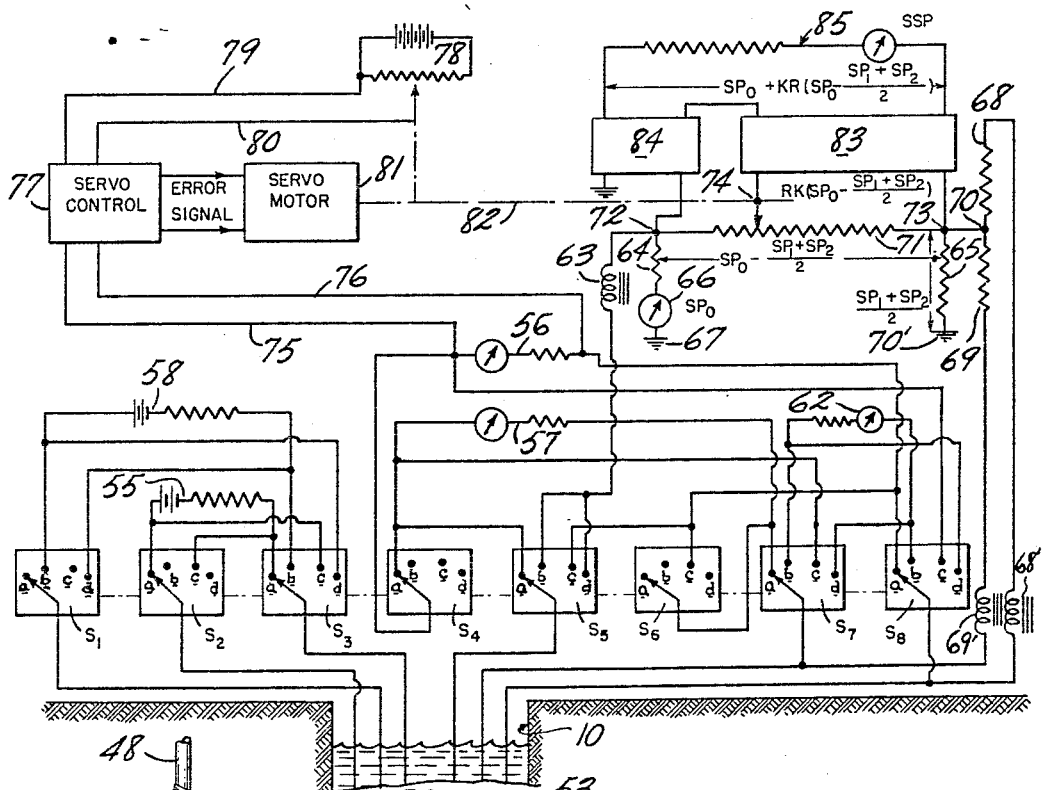
Figure 4 shows a second embodiment of the invention for obtaining a plurality of resistivity indications simultaneously with th estatic SP measurement.

In Figure 1, there is shown a bore hole 10 containing a column of conductive drilling liquid and traversing a plurality of typical earth formations $P_1$ $P_2$, $R_1$, $R_2$ and $R_3$. For purposes of illustration, the formations $P_1$ and $P_2$ are shown as being permeable and are sandwiched between the formations $R_1$, $R_2$ and $R_3$, which are impermeable. Each of these formations may for example have substantially the same resistivity. The permeable formations $P_1$ and $P_2$, however, are invaded by filtrate from the liquid 11, and thus have relatively highly resistive invaded zones 12. Due to the presence of the permeable formations $P_1$ and $P_2$, spontaneous currents will flow in the bore hole 10 through the conductive liquid 11.

A conventional log representing these currents, hereinafter called the SP log, may be obtained by measuring continuously between a reference electrode N, which may be at ground potential, for example, and an electrode M disposed in the bore hole 10, the direct potential difference caused by the flow of spontaneous or naturally occurring currents. In Figure 2, a typical conventional SP log is designated by the reference numeral 13, this log being obtainable by means of a high impedance recording galvanometer 13' connected between the electrodes M and N by a circuit including an insulated cable-conductor 13" (partially shown) and an A. C. blocking means 14. This SP log provides an accurate means for determining the presence of the permeable formations traversed by said bore hole. However, as can be seen from Figure 2, in thin highly resistive beds, such as the invaded formations $P_1$ and $P_2$, for example, a conventional SP log may be difficult to interpret as to the boundaries of permeable formations.

An additional electrode A may be placed a fixed, longitudinal distance from electrode M, and a source 15 of alternating current of constant intensity connected by means of insulated cable-conductors 15' and 15" (partially shown) between the electrode A and a reference electrode B, which may, for example, be placed in the bore hole at a fixed, electrically-remote distance above the array comprising the electrodes A and M. This electrode array and reference electrode B may be passed through the bore hole during a logging operation by means of a winch and a cable having electrical conductors (not shown).

As is well known, the alternating potential difference between the electrodes M and N will give a conventional resistivity log. In Figure 2, a typical resistivity log of the formations shown in Figure 1 is designated by the reference numeral 16 and may be obtained by means of an A. C. recording galvanometer 16′ connected between the electrodes M and N by way of the insulated cable-conductor 13″ (partially shown) and a D. C. blocking means 17.

The static SP of the formations, which may be defined as the total E. M. F. causing the flow of spontaneous currents in the bore hole, accurately indicates the vertical extent of permeable formations. A static SP diagram of the formations in Figure 1 is depicted in Figure 2 by means of broken lines. The amplitude of the spontaneous potential at any level is a direct function of the magnitude of the total E. M. F. (static SP) generating the spontaneous currents which create the measured spontaneous potential. The differences in potential $v$ between the amplitude of the conventional SP log and the static SP diagram (Fig. 2) are, therefore, due to the potential drop resulting from the flow of spontaneous currents through the formations. Since the amplitude of the spontaneous potential at any level is a function of the static SP and formation resistivity, it will be understood that the slope of the SP curve and the rate of change of this slope are functions of both the static spontaneous potentials along the bore hole and the resistivities of the formations. It is possible, therefore, to determine the approximate static SP by deriving values at corresponding points in the bore hole representing, respectively, the formation resistivity, the amplitude of the SP, and the rate of change of the slope of the SP curve.

In accordance with the present invention, the potential drop $v$ is determined to a close approximation and used to correct the values of the measured SP whereby continuous indication of an improved SP log, more nearly representative of the static SP, may be obtained. Measurements are taken along the length of the bore hole of the resistivities and the spontaneous potentials at successive levels. These measurements are utilized continuously to derive values which are representative of the potentials $v$ and these values are in turn utilized to derive values which are closely representative of the static SP.

Expressed mathematically, the potential difference $v$ is a function of formation resistivity and of the rate of change of the slope of the SP curve, approximately as follows:

$$v \cong -kR\frac{d^2SP}{dl^2} \quad (1)$$

where SP equals the amplitude of the spontaneous potential at any vertical depth $l$ in the bore hole, R equals a resistivity value obtained at the same level, and $k$ is a constant dependent on the type of resistivity measurement obtained. As indicated above, the static SP may be expressed by:

$$SSP = SP + v \quad (2)$$

and thus a quantity more nearly representative of the static SP as:

$$SSP \cong SP - kR\frac{d^2SP}{dl^2} \quad (3)$$

Assume that the spontaneous potential at the electrode M is $SP_0$ at a given instant; the spontaneous potentials at two fixed locations above and below electrode M are $SP_1$ and $SP_2$, respectively, (Fig. 2); then the Relation 3 above may be simplified and given approximately by:

$$SSP \cong SP_0 + KR\left(SP_0 - \frac{SP_1+SP_2}{2}\right) \quad (4)$$

where R is a resistivity value for the formation under consideration and K is an empirical constant dependent on the spacing of the fixed locations from electrode M and the type of resistivity measurement employed. Preferably, the quantities shown in Relation 4 above are simultaneously obtained during a single logging run and are continuously fed into an automatic computer whereby an improved indication substantially representative of the static SP is continuously obtained as the electrode array passes through the bore hole. The value to be assigned to K may, for example, be experimentally determined for a given apparatus by lowering the apparatus in a well and adjusting K until the improved SP log obtained is substantially identical with a static SP log obtained in accordance with my aforementioned patent. This setting for K, which may be between 0.1 and 0.2 (mhos per meter), may then be maintained for subsequent operations employing the given apparatus. A schematic example of such apparatus is shown in Fig. 3.

In Figure 3, an electrode array comprising electrodes A, $M_0$, $M_1$ and $M_2$ may be passed through the bore hole 10 by means of a conventional electric cable and winch combination (not shown). Alternating current of constant intensity from a source 19 may be passed between the electrode A in the bore hole array and the reference electrode B by means of insulated cable-conductors 20 and 20′. The electrode B may be located on the cable at a distance electrically remote from the electrode array. The alternating potential difference between the electrode $M_0$ and the reference electrode N is measured by means of a high impedance recording galvanometer 21 connected between the electrode N and the electrode $M_0$ by means of a D. C. blocking means 22 and a cable-conductor 23. The direct potential difference between the electrode $M_0$ and a reference electrode N′ is measured by a high impedance recording galvanometer 17 connected between the electrode N′ and the electrode $M_0$ by means of an A. C. blocking means 24 and the cable-conductor 23. As is well known, the meter 21 will give an indication R which is a function of the resistivity of the formation material opposite the electrode array, and the meter 17 will give an indication $SP_0$ of the spontaneous potential between the electrodes N′ and $M_0$.

The electrodes $M_1$ and $M_2$ are connected across a pair of series connected resistors 29 and 30 having equal resistance values by means of cable-conductors 25 and 26 and A. C. blocking means 27 and 28. The potential at the midpoint of the resistors 29 and 30 and a reference electrode N″, which is representative of the quantity $$\frac{SP_1+SP_2}{2}$$

is applied to a computing means 32 by means of conductors 33 and 34. Also applied to the computing means 32 is the quantity $SP_0$, which is received from the conductors 34 and 35, the conductor 34 being connected to the electrode N″ which is at ground potential. The computing means 32, which may be mechanical or electrical, for example, is adapted to give an output appearing at a conductor 36 equal to $$SP_0 - \frac{SP_1+SP_2}{2}$$

This output may be either electrical or mechanical.

The resistivity quantity R is applied by means of the conductors 37 and 38 to a second computing means 39 which may be either electrical or mechanical, for example. The output of the computing means 39, which appears in an electrical conductor 40, is equal to KR, where, as indicated above, K is an empirical constant determined for the electrode array being employed.

The quantities $$SP_0 - \frac{SP_1+SP_2}{2}$$

and KR are fed by the conductors 40 and 36 to a third computer 41, the output of which is equal to $$KR\left(SP_0 - \frac{SP_1+SP_2}{2}\right)$$

This latter quantity is fed, by means of a conductor 42, to a fourth computer 43 where it is added to the quantity $SP_0$. The output of the computer 43 as may be read from an indicator 44 is thus a quantity which is approximately equal to the static SP as established by the Relation 4 given above. This improved, more detailed SP value is preferably recorded continuously on the same log with R and $SP_0$ as a function of depth of the electrode array in the bore hole, as shown in Figure 2.

Where it is desired to obtain improved SP indications representing substantially the static SP in accordance with the present invention, along with a plurality of resistivity indications using a minimum number of cable-conductors, the apparatus shown in Figure 4 may be employed. It is adapted to provide three resistivity curves each representing a different depth of investigation, and a conventional SP curve, all simultaneously with a curve representing approximately the static SP of the formations in accordance with the present invention.

As shown in Figure 4A, the bore hole equipment may comprise a conventional sonde 45 including an electrode support 46 manufactured from insulating material, on which the electrodes A, $M_0$, $M_1$ and $M_2$, respectively, are wound. A suitable insulated housing 47 may form a part of the sonde 45. The sonde is adapted to be passed through the bore hole by means of a conventional six-conductor cable 48. Additional electrodes $A_1$, N and B may be wound on the cable 48 in the conventional manner, it being understood that the electrodes B and N are preferably disposed at electrically remote points from the electrodes $M_1$, $M_0$, $M_2$ and A. In Figure 4, the electrode array and the contents of the insulating housing 47 are shown schematically in the bore hole 10.

As shown in Figure 4, the cable 48 contains six insulated conductors 49, 50, 51, 52, 53 and 54 connected at the surface of the earth to a plurality of switches $S_2$, $S_1$, $S_3$, $S_5$, $S_7$, and $S_8$, respectively. These switches as well as switches $S_4$ and $S_6$ are ganged together and may comprise, for example, a commutator assembly, the action of which may be divided into four equal periods during each cycle, as represented by a series of four contact positions $a$, $b$, $c$ and $d$ on each of the switches. At any given instant all of the switches will be in the same relative contact position.

The switches are connected in various circuits between the several down-hole electrodes B, N, $A_1$, $M_1$, $M_0$, $M_2$, and A, and a number of indicating devices and current sources which are disposed at the surface of the earth, all as described below. By means of the switches, it is possible to obtain at once indications of at least three different resistivity values, a spontaneous potential value and a value representing the rate of change of the slope of the spontaneous potential curve.

For convenience, the system will be described as it is set up during successive quarter cycle contact positions $a$, $b$, $c$ and $d$ of the switches.

During the first quarter of the cycle, with each of the switches at the contact position $a$, a substantially constant direct current from a source 55 is applied to the current electrodes A and B by means of a circuit including the switches $S_2$ and $S_3$ and the conductors 49 and 51. A high impedance recording galvanometer 56 for indicating resistivity is connected between the electrodes N and $M_2$ by means of a circuit including the switches $S_4$, $S_5$, and $S_8$, the conductors 52 and 54 and a down-hole switch 61, which is part of a relay 60 and which will be in engagement with a contact 61$a$ when the relay is not energized. A high impedance galvanometer 57, also for indicating resistivity, is connected between the electrodes N and $M_1$ by means of a circuit including the switches $S_5$ and $S_7$ and the conductors 52 and 53.

During the second quarter of the cycle, with each of the switches at the contact position $b$, the source 55 and the galvanometers 56 and 57 are disconnected. Direct current from a source 58 is applied to the current electrodes $A_1$ and B by means of a circuit including the switches $S_1$ and $S_3$, the conductors 50 and 51, and a coil 59 of the relay 60. This current flow in the coil 59 causes the relay switch 61 to move to its contact 61$b$. A high impedance galvanometer 62 for indicating resistivity is connected between the electrodes $M_1$ and $M_2$ by means of a circuit including the switches $S_7$ and $S_8$ and the conductors 53 and 54. A high impedance galvanometer 66 for indicating spontaneous potential is connected between the electrode $M_0$ and ground at 67 by means of a circuit including the contact 61$b$ and the switch 61 of the now energized relay 60, the switch $S_5$, the conductor 52, a smoothing choke 63 and a resistor 64.

During the third quarter of the cycle, with each of the switches at the contact position $c$, the direction of current flow between the electrodes A and B from the source 55 is reversed with respect to its direction during the first quarter of the cycle by the action of the switches $S_2$ and $S_3$. The polarity of the galvanometer 56, which is connected between the electrodes N and $M_2$, is reversed with respect to the polarity during the first quarter of the cycle by the action of the switches $S_5$ and $S_8$. It should be noted that during this quarter of the cycle the relay coil 59 will be deenergized so that the switch 61 will be in engagement with the contact 61$a$. The polarity of the galvanometer 57 which is connected between the electrodes N and $M_1$, is also reversed with respect to the polarity during the first quarter of the cycle by the action of the switches $S_5$, $S_6$ and $S_7$.

During the fourth quarter of the cycle, with each of the switches at the contact position $d$, the source 55 and the galvanometers 56 and 57 are disconnected. Direct current from the source 58 is reversed, with respect to the second quarter of the cycle, between the electrodes $A_1$ and B by the action of the switches $S_1$ and $S_3$. This flow of current energizes the relay coil 59 to move the switch 61 to the contact 61$b$. The polarity of the galvanometer 62, which is connected between the electrodes $M_1$ and $M_2$, is reversed by the action of the switches $S_7$ and $S_8$. The galvanometer 66 is connected between the electrode $M_0$ and ground at 67 through the switch 61 and contact 61$b$ of the now energized relay 60.

As is well known in the art, the galvanometer 56 will give an indication of the electrical resistivity of the formations opposite the electrode array representing a short distance of investigation, the galvanometer 57 will give an indication of the electrical resistivity at a greater depth of investigation, and the galvanometer 62 will give an indication of the electrical resistivity at a substantial depth in the formation. It should be noted that though the polarity of the current in the electrodes A and B is alternated in the first and third quarters of the cycle, the measurements at the galvanometers 56 and 57 are D. C. due to the rectifying actions of the switches. The same is true of the measurements by the galvanometer 62 during the second and fourth quarters of the cycle. Thus any D. C. due to spontaneous potentials is, in effect, removed, yet the measurements may be made by simple D. C. recording galvanometers.

It should be noted further that since the polarity of the current flowing in the galvanometer 66 between the electrode $M_0$ and ground 67 during the second and fourth quarters of the cycle is not reversed, the galvanometer 66 will give an indication of the spontaneous potential $SP_0$ between the electrode $M_0$ and ground 67.

It will be understood that the duration of the switching cycles and the inertia of the galvanometers are such that the latter will give substantially constant readings. Also, the smoothing choke 63 will act to provide a substantially continuous signal at the ungrounded terminal 72 of the resistor 64 for use in the computing system described below.

The direct potential difference between the electrodes $M_1$ and $M_2$ is applied across a pair of series connected resistors 68 and 69 through A. C. blocking means 68' and 69'. Between a center tap 70 of the resistors 68 and 69 and ground 70' is connected a resistor 65, which preferably has a high ohmic resistance to that of the resistor 64 and the internal resistance of the galvanometer 66. A third, high resistance resistor 71 is connected between the ungrounded terminals 72 and 73 of the resistors 64 and 65, respectively. Since the potential across the resistor 64 is $SP_0$ and across the resistor 65 is $$\frac{SP_1+SP_2}{2}$$

the potential between the terminals 72 and 73 of the resistor 71 is $$SP_0 - \frac{SP_1+SP_2}{2}$$

A movable tap 74 is provided on the resistor 71. The potential between the tap 74 and the terminal 73 is equal to $$K''\left(SP_0 - \frac{SP_1+SP_2}{2}\right)$$

where $K''$ is equal to the distance between the tap 74 and the end of the resistor 71 divided by the total length of the resistor 71 (assuming a uniform resistor).

$K''$ may be varied by moving the tap 74 along resistor 71 in accordance with a resistivity value R measured in the bore hole. To this end the potential value R across the galvanometer 57 may be applied by means of conductors 75 and 76 to a servo control means 77, where R is compared to a potential from a potentiometer 78 transmitted thereto by conductors 79 and 80. The difference between the two potentials produces an error signal which is supplied to a servomotor 81, which will cause a driving means 82 to move until the error signal is reduced to zero. The driving means 82 also moves the tap 74 on the resistor 71 and the setting thereof is thus dependent on the quantity R. Accordingly, $K''$ may be made continuously equal to KR as R varies during logging.

The value $$KR\left(SP_0 - \frac{SP_1+SP_2}{2}\right)$$

is applied to a decoupling circuit 83 and the value $SP_0$ is applied to a decoupling circuit 84. The output of these decoupling circuits may be applied in series across a high impedance galvanometer 85 whereby the galvanometer will vary continuously as the function $$SP_0 + KR\left(SP_0 - \frac{SP_1+SP_2}{2}\right)$$

which, as indicated in Relation 4 above, is substantially representative of the static SP.

Accordingly, with the apparatus shown in Figure 4, three resistivity curves, a spontaneous potential curve, and a static spontaneous potential curve may be simultaneously obtained at the meters 56, 57, 62, 66 and 85 respectively, and are preferably recorded on a single log as a function of depth.

Figure 5:
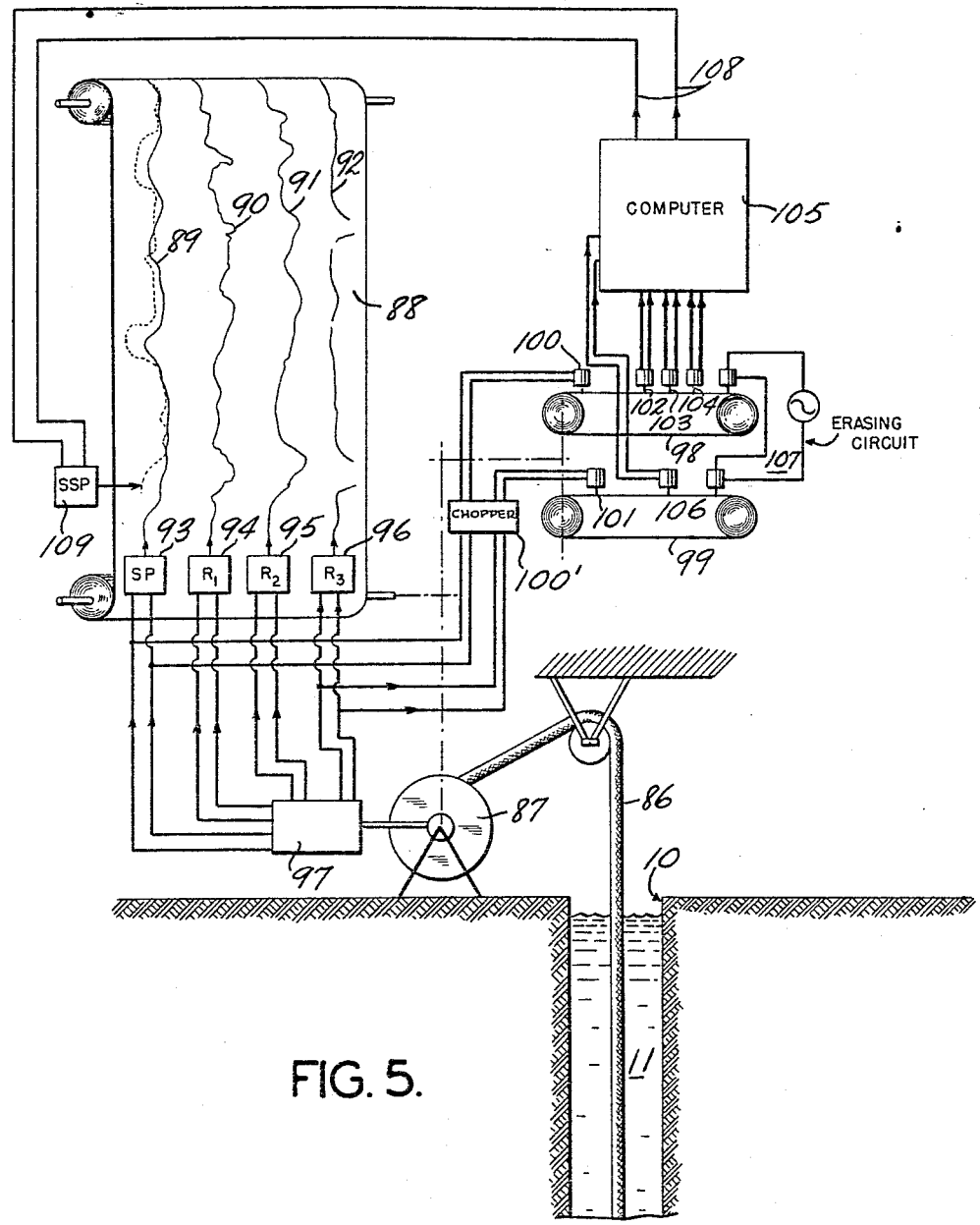
Figure 5 shows schematically another embodiment of the invention which may be employed at the surface of the earth in conjunction with bore hole apparatus.

In Figure 5 is shown surface equipment for carrying out the methods of the present invention and which may be readily connected to existing logging equipment without necessitating any substantial changes therein, that is, without adding electrodes to the down-hole equipment. Thus, for example, quantities representing the rate of change of the slope of the SP curve may be obtained and an improved log of spontaneous potentials recorded using a minimum number of cable-conductors.

A cable 86 and a winch 87 may be employed to pass a conventional electrode array (not shown) through the bore hole 10. In general practice, a plurality of measurements are made and recorded on a log tape 88 which moves with the winch 87, thus giving a record as a function of depth. On the log tape 88 there may, for example, be an SP curve 89 and three resistivity curves 90, 91 and 92, recorded by means of galvanometers 93, 94, 95 and 96, respectively, which in turn receive their signals from a control panel 97 connected to the cable 86. All of this apparatus is conventional.

In addition, there are provided two recording means 98 and 99 which are preferably wire recorders adapted to be driven with the winch 87. A recording head 100 records the SP measurement across the galvanometer 93 on the recorder 98, a D. C. chopper 100' being provided to convert the signals to A. C. Three pick-up heads 102, 103 and 104 are spaced along wire 98 as a function of a desired spacing along the length of the bore hole to pick up signals representative of $SP_1$, $SP_0$ and $SP_2$, respectively. The three signals are fed into a computer 105. The recording head 101 records, through the chopper 100', the value R, which appears across the galvanometer 96, on the recording means 99. The recorded signal is fed by a pick-up 106 to the computer 105 so as to be synchronized with $SP_0$. A conventional erasing means 107 may be employed to remove previously made measurements from the recording means 98 and 99.

The computer 105 provides at its output 108 a signal equal to $$SP_0 + KR\left(SP_0 - \frac{SP_1+SP_2}{2}\right)$$

which, as indicated heretofore, is substantially the static SP at the output 108 may be recorded on the log tape 88 by means of a recording galvanometer 109, the log being shown in broken lines.

In Figure 6 is shown schematically means for obtaining an improved SP log which approximates the static SP in accordance with Relation 3 above:

$$SSP \cong SP - kR\frac{d^2SP}{dl^2}$$

(3)

The SP and resistivity measuring apparatus may be conventional and of the type shown in Figure 1 for example. Thus in Figure 6 the variable quantities SP and R exist across a pair of resistors 114 and 115 of recording galvanometers 13' and 16' respectively.

If the velocity $$\frac{dl}{dt}$$

of the electrodes passing through the bore hole is maintained constant, i. e.

$$\frac{d^2l}{dt^2}=0$$

the Relation 3 may be changed into a function of time $t$ as follows:

$$SSP \cong SP - K'R\frac{d^2SP}{dt^2} \qquad (5)$$

where $K'$ is a constant not only dependent on the type of resistivity measurement made, but also on the constant velocity employed, and may be determined experimentally for a particular electrode array in substantially the same manner as for K in the Relation 4 above. Thus, the quantity SP may be fed into two series connected differentiating circuits 116 and 117, the output of which is multiplied by $K'R$ to give $$K'R\frac{d^2SP}{dt^2}$$

This latter quantity may be fed into still another computer 118 in combination with the quantity SP, and the former subtracted from the latter whereby the recording galvanometer 119 records continuously the function $$SP - K'R\frac{d^2SP}{dt^2}$$

As indicated in Relation 5 above, this quantity gives an improved SP log.

If the velocity of the electrode array is not maintained constant, it will be necessary to insert the quantity $$\frac{d^2l}{dt^2}$$

into the computing circuits to correct for variations in velocity.

In Figure 7 is shown by way of an example, a typical computing circuit that may be employed to give an output equal to the Relation 5 above, having as an input the quantities SP and R. The circuit includes two R.-C. differentiating circuits 120 and 121 connected in series, the output $$K'\frac{d^2SP}{dt^2}$$

of which appears across a resistor 122. The resistor 122 is provided with a slide tap 123 to form a voltage divider. The slide tap 123 is moved proportionally to the resistivity R by driving means 124 such, for example, as a servomechanism, so that the output signal from the differentiating circuits is multiplied by R. The output taken across an input terminal 125 and the slide tap 123 will be the Relation 5 above. Thus this simple means may be employed for obtaining an improved SP log where the velocity of the electrode array is maintained substantially constant.

The double differentiating apparatus shown in Figure 7 may be modified to compensate for variations in R without the use of a servomechanism control system, as shown, for example, in Figure 8. The signal SP is applied to a pair of series connected R.-C. differentiating circuits 130 and 131, containing variable gain amplifiers which may be in the form of electronic tubes 132 and 133, respectively. The output of the circuit 131, which appears across a resistor 134, will be the quantity $$\frac{d^2SP}{dt^2}$$

multiplied by the gain in the amplifying tubes 132 and 133. In accordance with the invention, the total gain is made continuously proportional to R whereby the potential across the resistor 134 is equal to $$R\frac{d^2SP}{dt^2}$$

An adjustable tap 135 on the resistor 134 picks off the quantity $$K'R\frac{d^2SP}{dt^2}$$

which quantity is applied to one side of a high impedance recording galvanometer 136. The other side of the galvanometer 136 is connected to receive the SP signal so that the galvanometer will indicate the difference between the quantity SP and the quantity at the slide tap 134, thus giving substantially the static SP in accordance with Relation 5 above.

The total gain of the amplifiers 132 and 133 may be made equal to R by varying the D. C. bias on AVC control grids 137 and 138. This variable bias voltage may be obtained by passing a unit low frequency $f_1$ signal from a crystal oscillator 139 through the amplifiers 132 and 133 simultaneously with the variable D. C. SP signal. The signal of frequency $f_1$ may be filtered by a filtering means 140 from the output of the amplifying network and rectified by a rectifier means 141. The D. C. signal between a terminal 142 of a resistor 143 and ground is thus equal to the gain of the amplifiers (assuming unit voltage $f_1$ input). The variable D. C. voltage R is applied between the other terminal 144 of the resistor 143 and ground. The voltage across the resistor 143 is thus equal to the difference between R and the gain of the amplifiers. This error signal may be applied to a bias control circuit 145 to vary the gain substantially in proportion to R (no error signal).

If the resistivity variations between formations are small, there may be substituted for the quantities KR or K'R in the Relations 4 and 5 above, suitable constants equal to the average values of KR or K'R, respectively. This will still give an improved SP log substantially equal to the static SP without the necessity of using a variable R in the computers. Even if the resistivity variations are large and thus make impossible the substitution of a suitable constant for KR or K'R, an improved SP log will nonetheless be obtained. For example, in logging formations of the type found in the Gulf Coast region, a suitable constant value employed in lieu of KR in the Relation 4 above was equal to 0.5, where the spacing between the electrodes $M_0$ and $M_2$ and that between the electrodes $M_0$ and $M_1$ equaled 0.40 meters. For K'R in the Relation 5 above, a constant on the order of 0.10 is suitable for a logging speed of 7200 feet per hour.

It will be understood, therefore, that novel methods and apparatus are provided in accordance with the present invention for obtaining improved SP logs of earth formations traversed by bore holes and that while the invention has been described and illustrated in several preferred forms it may also be embodied in other forms which will readily be apparent to those skilled in the art. The invention should not, therefore, be thought of as limited in scope other than as defined in the following claims.

I claim:

1. In a method of determining a spontaneous potential characteristic of a formation traversed by a bore hole, the steps of measuring the spontaneous potential at a point in the bore hole, determining the rate of change of the slope of the spontaneous potential curve for the bore hole at the said point, supplying values representing the spontaneous potential and the rate of change of the slope of the spontaneous potential curve as quantities in an equation representing the desired spontaneous potential characteristic of the formation, and indicating the solution of this equation as a function of the location of the point in the bore hole.

2. In a method of determining a spontaneous potential characteristic of a formation traversed by a bore hole, the steps of measuring the resistivity of the formation at a point along the length of the bore hole, measuring the spontaneous potential at the said point, determining at the said point the rate of change of the slope of the spontaneous potential curve for the bore hole, supplying values representing the resistivity, the spontaneous potential, and the rate of change of the slope of the said curve as quantities in an equation representing the desired spontaneous potential characteristic of the formation, and indicating the solution of the equation as a function of the location of the point in the bore hole.

3. In a method of determining a spontaneous potential characteristic of a formation traversed by a bore hole, the steps of measuring the resistivity of the formation at a point in the bore hole, measuring the spontaneous potential of the formation as a value representing the potential between said point and a reference point and simultaneously measuring the spontaneous potentials of the formation at points spaced above and below said point to derive a value representing the rate of change at the said point of the slope of the curve representing the spontaneous potentials of the bore hole, supplying values representing the resistivity, the spontaneous potential and the rate of change of the slope of said curve as quantities in an equation representing the desired spontaneous potential characteristic of the formation, and indicating the solution of the equation as a function of the location of the point in the bore hole.

4. In a method of determining a spontaneous potential characteristic of formations traversed by a bore hole containing electrically conductive liquid, the steps of passing an electrode array through the bore hole at a known rate, detecting by the use of the electrode array the spontaneous potentials of the formations traversed by the bore hole, determining as a function of the rate of movement of the electrode array through the bore hole the time rates of change of the slope of the curve of the spontaneous potentials for the formations traversed by the bore hole, supplying, in an equation representing the desired spontaneous potential characteristic of the formations, values representing, for corresponding points in the bore hole, the spontaneous potential and the time rate of change of the slope of the spontaneous potential curve, and indicating the solution of the equation as a function of the location of the points in the bore hole.

5. In a method of determining a characteristic of a formation traversed by a bore hole containing a electrically conductive liquid, the steps of measuring the potentials between successive points along the length of the bore hole and a reference point, recording successive values representative of the potentials as a function of the locations of the potentials in the bore hole, and detecting the recorded values simultaneously at a plurality of points spaced apart by distances representing given distances along the length of the bore hole to ascertain the rate of change of the slope of the curve representing successive potentials between the said points along the length of the bore hole and the reference point.

6. In a method as set forth in claim 5 including the steps of measuring the resistivities of formations traversed by the bore hole and recording the successive values representative of the resistivities as a function of the localities thereof in the bore hole, detecting the recorded resistivity values in synchronism with the detection of one of the recorded values representing potentials between points in the bore hole and a reference point, supplying the several detected values as quantities in an equation representing a characteristic of a formation traversed by the bore hole, and indicating the solution of the equation as a function of the locations in the bore hole at which the measurements were made.

7. In well logging apparatus, means responsive to spontaneous potentials in a bore hole for providing a first quantity representative of the rate of change of the slope of the spontaneous potential curve at a given point in the bore hole, means responsive to spontaneous potentials in the bore hole for providing a second quantity representative of the spontaneous potential at the given point, and computing means for combining said first and second quantities to yield a single quantity representative of a desired, modified spontaneous potential characteristic at the given point.

8. In well logging apparatus, means responsive to spontaneous potentials in a bore hole for providing a first quantity representative of the rate of change of the slope of the spontaneous potential curve at a given point in the bore hole, means responsive to spontaneous potentials in the bore hole for providing a second quantity representative of the spontaneous potential at the given point, means providing a third quantity representative of the electrical resistivity of the formation traversed by the bore hole at the given point, and computing means responsive to said first, second and third quantities to yield a single quantity representative of a desired, modified spontaneous potential characteristic at the given point.

9. In well logging apparatus, means for measuring potentials between a reference point and at least three points spaced apart longitudinally in the bore hole, means providing a first quantity representative of the spontaneous potential at one of said points, means providing a second quantity representative of the average spontaneous potentials at the other two points, and computing means responsive to said first and second quantities to provide a quantity representative of a modified spontaneous potential characteristic of the formation at said one point.

10. In well logging apparatus, means for measuring potentials between a reference point and at least three points spaced apart longitudinally in the bore hole, means providing a first quantity representative of the spontaneous potential at one of said points, means providing a second quantity representative of the average spontaneous potentials at the other two points, means providing a third quantity representative of the electrical resistivity of the surrounding formation at said one point, and computing means responsive to said first, second and third quantities to provide a quantity representative of a modified spontaneous potential characteristic at said one point.

11. In combination, input means for receiving a continuously variable input signal, means connected to said input means and comprising at least one member adapted to be passed through a bore hole for providing an input signal representing spontaneous potentials, first recording means for recording the signal as a function of time, a plurality of first pick-up means associated with said first recording means for simultaneously providing a plurality of signals, each of which is representative of the input signal at a different time, first computing means responsive to said plurality of signals to provide a quantity representative of the rate of change of the slope at one point of the curve representing the input signal, and second computing means connected to receive a signal representative of spontaneous potential, and said quantity, representative of the rate of change of the slope of the spontaneous potential curve to provide an output representative of a spontaneous potential characteristic in said bore hole.

12. In combination, at least one member adapted to be passed through a bore hole for providing an input signal representing spontaneous potentials, first recording means for recording said input signal as a function of time, a plurality of first pick-up means associated with said first recording means for simultaneously providing a plurality of signals, each of which is representative of said input signal at a different time, first computing means responsive to said plurality of signals to provide a quantity representative of the rate of change of the slope at one point of the curve representing said input signal, means including at least one member adapted to be passed through the bore hole to provide a second input signal representative of the electrical resistivity of the surrounding formations, second recording means for recording said second input signal, second pick-up means associated with said second recording means for providing a quantity representative of resistivity and synchronized with a signal from at least one of said first pick-up means, and second computing means connected to receive said signal representative of resistivity, a signal representative of spontaneous potential and said quantity representative of the rate of change of the slope of the spontaneous potential curve to provide an ouput representative of a spontaneous potential characteristic in said bore hole.

13. In well logging apparatus, means for providing first quantities representative of the spontaneous potentials in a well, said first quantities being provided in a preestablished time relationship, differentiating means responsive to the first quantities to provide second quantities which are the second differential of the first quantities and representative of the rate of change of the slope of the time-amplitude curve of said first quantities, and output means controlled by said first and second quantities to provide an output representative of a modified spontaneous potential characteristic of the formation.

14. In well logging apparatus, the combination as set forth in claim 13 including means providing third quantities representative of the resistivities of the formation at successive points corresponding to the sources of said first quantities, said computing means being responsive to said first, second and third quantities.

15. In well logging apparatus as set forth in claim 14, including amplifying means, means connecting the amplifying means to receive an input signal representative of said first quantities, means providing an A. C. input signal for said amplifying means, filter means in the output of said amplifying means for filtering the amplified A. C. signal to provide fourth quantities representative of the amplification of the amplifying means, a network connected to receive both the fourth quantities from the filter means and the said third quantities to provide an error signal, means responsive to said error signal to control the total amplification of said amplifying means, whereby the output of said amplifying means and of said differentiating means is the second differential of said first quantity amplified by a factor representative of the third quantity, the voltage differential between this output and the first quantity being representative of a modified spontaneous potential characteristic of said formation.

16. In well logging apparatus, means providing first signals representing, as a function of time, spontaneous potentials in the well, means providing second signals representative of the electrical resistivity of formations traversed by the well, differentiating means connected to receive said first signals and to provide an output representative of the rate of change of the slope of the curve of spontaneous potentials for the well, servo means responsive to said second signals for modifying the output of said differentiating means, and means providing a signal representing for corresponding points in the well the difference between the first signals and the output signals, as modified by said servo means, of said differentiating means.

17. In well logging apparatus, a series of electrodes adapted to be lowered into a bore hole containing a column of electrically conductive liquid and connected to the surface of the earth by a series of electrical conductors, a first source of D. C. at the surface of the earth, first circuit means including first switch means connecting the source of D. C. between a first of said electrodes and a reference point, and second circuit means including second switch means connecting a second of said electrodes to a reference point to pick up signals representing the electrical resistivity of a formation adjacent the second electrode, a second source of D. C. at the surface of the earth, third circuit means including third switch means connecting the second source of D. C. between a third of said electrodes and a reference point, and fourth circuit means including fourth switch means connecting a fourth of said electrodes to a reference point to pick up signals representing the resistivity of the formation adjacent the fourth electrode, said first, second, third and fourth switch means being constructed and arranged to be operated in synchronism to provide repeating cycles of operation of at least four parts each, the first source of D. C. being connected in alternating polarity to the first electrode during the first and third parts, the second source of D. C. being connected in alternating polarity to the third electrode during the second and fourth parts, and the second and fourth circuit means being alternated in polarity during the first and third and second and fourth parts, respectively.

18. Well logging apparatus as set forth in claim 17 including fifth circuit means having fifth switch means operated in synchronism with the other switch means and connecting a fifth of said electrodes to a reference point to pick up spontaneous potentials in the bore hole, said fifth electrode being disposed between said second and fourth electrodes, said fifth circuit means and said second and fourth circuit means employing a common electrical conductor in the bore hole, a relay adapted to be disposed in the bore hole and connected to be responsive to a flow of current in the first circuit means to connect the fifth electrode to the said common conductor, said second and fourth electrodes being connected to the common conductor when no current is flowing in the first circuit means.

19. Well logging apparatus as set forth in claim 18 including sixth circuit means connecting the said second and fourth electrodes to a reference point, and means responsive to the signals from the second, fourth and fifth electrodes for providing a quantity representing the rate of change of the slope of the curve of the spontaneous potentials picked up by said fifth electrode.

References Cited in the file of this patent

UNITED STATES PATENTS 2,442,383     Steward et al.            June 1, 1948

FOREIGN PATENTS 597,026      Great Britain            Jan. 16, 1948